US012711892B2

(12) United States Patent
Liao et al.

(10) Patent No.: US 12,711,892 B2
(45) Date of Patent: Aug. 18, 2026

(54) DRIVING METHOD FOR DISPLAY PANEL AND RELATED SOURCE OPERATIONAL AMPLIFIER

(71) Applicant: NOVATEK Microelectronics Corp., Hsin-Chu (TW)

(72) Inventors: Po-Sheng Liao, Hsinchu City (TW); Chi-Hung Lin, Hsinchu County (TW); Shih-Hsiang Pan, Miaoli County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/641,462

(22) Filed: Apr. 22, 2024

(65) Prior Publication Data

US 2024/0420612 A1 Dec. 19, 2024

Related U.S. Application Data

(60) Provisional application No. 63/521,638, filed on Jun. 16, 2023.

(51) Int. Cl.
*G09G 3/20* (2006.01)
*G09G 3/32* (2016.01)
*G09G 3/3225* (2016.01)

(52) U.S. Cl.
CPC ............. *G09G 3/2011* (2013.01); *G09G 3/32* (2013.01); *G09G 3/3225* (2013.01); *G09G 2310/0291* (2013.01); *G09G 2330/021* (2013.01)

(58) Field of Classification Search
CPC ..... G09G 2310/0291; G09G 2330/021; G09G 3/2011; G09G 3/32; G09G 3/3225; G09G 3/3291; G09G 5/395; G09G 3/3233; G09G 3/3266; G09G 3/3688; G09G 5/00; G09G 3/2092; G09G 3/3677; H10D 62/151; H03F 3/347
See application file for complete search history.

(56) References Cited

U.S. PATENT DOCUMENTS

| | | | | |
|---|---|---|---|---|
| 8,542,221 | B1 * | 9/2013 | Wyatt | G09G 5/00 345/204 |
| 2012/0038618 | A1 * | 2/2012 | Koyama | G09G 3/3688 345/212 |
| 2016/0275850 | A1 * | 9/2016 | Zheng | G09G 3/32 |
| 2018/0012552 | A1 * | 1/2018 | Masui | G09G 5/395 |
| 2019/0244579 | A1 * | 8/2019 | Oh | G09G 3/3291 |
| 2020/0202816 | A1 * | 6/2020 | Kim | G09G 3/2092 |
| 2021/0149427 | A1 * | 5/2021 | Moctezuma | H03F 3/347 |
| 2021/0256898 | A1 | 8/2021 | Kim | |

(Continued)

FOREIGN PATENT DOCUMENTS

| | | |
|---|---|---|
| CN | 107205293 | 9/2017 |
| CN | 110379362 | 10/2019 |

(Continued)

*Primary Examiner* — Richard J Hong
(74) *Attorney, Agent, or Firm* — Winston Hsu

(57) ABSTRACT

A driving method includes steps of: providing a source operational amplifier (SOP) to drive a display element; operating the SOP at a first bias current value when the display element is refreshed with a first refresh rate; and operating the SOP at a second bias current value different from the first bias current value when the display element is refreshed with a second refresh rate different from the first refresh rate.

21 Claims, 16 Drawing Sheets

(56) References Cited

U.S. PATENT DOCUMENTS

| | | | | |
|---|---|---|---|---|
| 2021/0295782 | A1* | 9/2021 | Bae | G09G 3/3688 |
| 2022/0059030 | A1* | 2/2022 | Sang | G09G 3/3233 |
| 2023/0335064 | A1* | 10/2023 | Her | G09G 3/3266 |
| 2024/0135861 | A1* | 4/2024 | Wang | G09G 3/32 |
| 2024/0321223 | A1* | 9/2024 | Kim | H10D 62/151 |
| 2024/0412706 | A1* | 12/2024 | Chien | G09G 3/3677 |
| 2025/0061858 | A1* | 2/2025 | Sang | G09G 3/3233 |

FOREIGN PATENT DOCUMENTS

| | | |
|---|---|---|
| CN | 111798787 | 10/2020 |
| CN | 114708830 | 7/2022 |
| TW | 201240347 | 10/2012 |

* cited by examiner

| Image frame | F(X) | | | | | | F(X+1) | | | | | |
|---|---|---|---|---|---|---|---|---|---|---|---|---|
| Pixel arrangement | R | G | B | R | G | B | R | G | B | R | G | B |
| L(N) | + | - | + | - | + | - | - | + | - | + | - | + |
| L(N+1) | - | + | - | + | - | + | + | - | + | - | + | - |
| L(N+2) | + | - | + | - | + | - | - | + | - | + | - | + |
| L(N+3) | - | + | - | + | - | + | + | - | + | - | + | - |

FIG. 2

| Image frame | F(X) | | | | | | | F(X+1) | | | | | |
|---|---|---|---|---|---|---|---|---|---|---|---|---|---|
| Pixel arrangement | R | G | B | R | G | B | | R | G | B | R | G | B |
| L(N) | + | - | + | - | + | - | | - | + | - | + | - | + |
| L(N+1) | - | + | - | + | - | + | | + | - | + | - | + | - |
| L(N+2) | + | - | + | - | + | - | | - | + | - | + | - | + |
| L(N+3) | - | + | - | + | - | + | | + | - | + | - | + | - |

High brightness deviation

FIG. 4A

| Image frame | F(X) | | | | | | F(X+1) | | | | | |
|---|---|---|---|---|---|---|---|---|---|---|---|---|
| Pixel arrangement | R | G | B | R | G | B | R | G | B | R | G | B |
| L(N) | + | - | + | - | + | - | - | + | - | + | - | + |
| L(N+1) | - | + | - | + | - | + | + | - | + | - | + | - |
| L(N+2) | + | - | + | - | + | - | - | + | - | + | - | + |
| L(N+3) | - | + | - | + | - | + | + | - | + | - | + | - |

Low brightness deviation

FIG. 4B

DRIVING METHOD FOR DISPLAY PANEL AND RELATED SOURCE OPERATIONAL AMPLIFIER

CROSS REFERENCE TO RELATED APPLICATIONS

This application claims the benefit of U.S. Provisional Application No. 63/521,638, filed on Jun. 16, 2023. The content of the application is incorporated herein by reference.

BACKGROUND OF THE INVENTION

1. Field of the Invention

The present invention relates to a driving method for a display panel, and more particularly, to a driving method used in a driving circuit for controlling a display panel and a related source operational amplifier (SOP) included in the driving circuit.

2. Description of the Prior Art

The low-temperature polycrystalline oxide (LTPO) technology is an evolution of the low-temperature polycrystalline silicon (LTPS). In an LTPO panel, several thin-film transistors (TFTs) coupled to the storage capacitors in the pixels may be implemented with N-type metal oxide semiconductor (NMOS) transistors, which can be fully cutoff to minimize the leakage current in their off state, thereby fully isolating the leakage path of electric charges from the capacitors. Due to the low leakage feature, the LTPO display can support an extremely low frame rate such as 1 Hz (1 refresh per second) or 0.016 Hz (1 refresh per minute).

In a display driver integrated circuit (DDIC), the source operational amplifier (SOP) for outputting display data voltages to the display panel usually applies a chopper technique to cancel the voltage offset of the SOP. The voltage offset of the SOP refers to a voltage error between two input terminals of the SOP. However, if the panel displays with an extremely low frame rate such as 1 Hz or 0.016 Hz, the same image will stay on the panel too long such that the brightness deviation caused by the voltage offset might be easily seen under the usage of chopper technique. Thus, there is a need for improvement over the prior art.

SUMMARY OF THE INVENTION

It is therefore an objective of the present invention to provide a novel driving method for a display panel and a related source operational amplifier (SOP), in order to solve the abovementioned problems.

An embodiment of the present invention discloses a driving method, which comprises steps of: providing an SOP to drive a display element; operating the SOP at a first bias current value when the display element is refreshed with a first refresh rate; and operating the SOP at a second bias current value different from the first bias current value when the display element is refreshed with a second refresh rate different from the first refresh rate.

Another embodiment of the present invention discloses a driving method for driving a plurality of display elements. The driving method comprises steps of: providing an SOP to drive the plurality of display elements; operating the SOP at a first bias current value when a first display element among the plurality of display elements is refreshed with a first refresh rate; and operating the SOP at a second bias current value different from the first bias current value when a second display element among the plurality of display elements is refreshed with a second refresh rate different from the first refresh rate.

Another embodiment of the present invention discloses a driving circuit, which comprises an SOP configured to drive a plurality of display elements. The SOP is operated at a first bias current value when a first display element among the plurality of display elements is refreshed with a first refresh rate and operated at a second bias current value different from the first bias current value when a second display element among the plurality of display elements is refreshed with a second refresh rate different from the first refresh rate.

Another embodiment of the present invention discloses a driving circuit, which comprises a first SOP and a second SOP. The first SOP is configured to drive a first display element of a display panel. The second SOP is configured to drive a second display element of the display panel. The first SOP is operated at a first bias current value when the first display element is refreshed with a first refresh rate and the second SOP is operated at a second bias current value different from the first bias current value when the second display element is refreshed with a second refresh rate different from the first refresh rate.

Another embodiment of the present invention discloses an SOP for driving a plurality of display elements on a display panel. The SOP comprises a differential input pair, a current source pair and a first bias control circuit. The differential input pair is configured to receive an input signal of the SOP. The current source pair is configured to provide an operating current for the SOP. The first bias control circuit is configured to supply a first bias current to one of the differential input pair and the current source pair. When a refresh rate of a display element among the plurality of display elements driven by the SOP changes, the first bias current generated by the first bias control circuit is adjusted accordingly.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a pixel arrangement of chopper configuration in several image frames.

FIG. 4A and FIG. 4B illustrate a comparison of the chopper effect realized under different bias currents.

DETAILED DESCRIPTION

Figure 1:
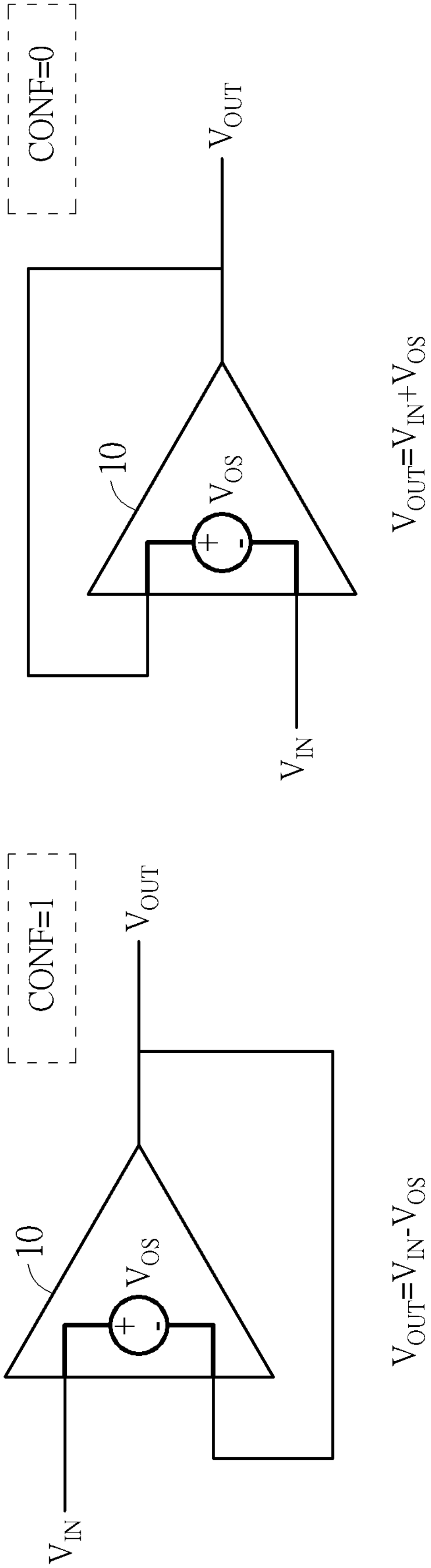
FIG. 1 is a schematic diagram of an SOP with the chopper technique.

FIG. 1 is a schematic diagram of a source operational amplifier (SOP) 10 with the chopper technique. The SOP 10 is connected as a negative feedback structure to form an output buffer, which is configured to forward an input signal $V_{IN}$ to generate an output voltage $V_{OUT}$. Ideally, the output voltage $V_{OUT}$ is equal to the input signal $V_{IN}$ to achieve an accurate data voltage for driving the display panel. However, there is an offset voltage $V_{OS}$ between the two input terminals of the SOP 10, resulting in an error that makes the output voltage $V_{OUT}$ slightly different from the input signal $V_{IN}$.

As shown in FIG. 1, by using the chopper technique, the SOP 10 may have two configurations, where the input signal $V_{IN}$ may be input to the upper input terminal and the lower input terminal of the SOP 10 alternately, and the other terminal is connected to its output terminal to form the feedback loop. More specifically, in the first configuration (CONF=1), the input signal $V_{IN}$ is received through the upper input terminal, and the output voltage $V_{OUT}$ may be equal to $V_{OUT}=V_{IN}-V_{OS}$. In the second configuration (CONF=0), the input signal $V_{IN}$ is received through the lower input terminal, and the output voltage $V_{OUT}$ may be equal to $V_{OUT}=V_{IN}+V_{OS}$.

The chopper technique allows the SOP 10 to be switched between the first configuration and the second configuration alternately, in order to cancel the SOP's voltage offset in temporal and spatial aspects. FIG. 2 illustrates a pixel arrangement of chopper configuration in several image frames, where several lines L(N)–L(N+3) of pixels in two consecutive image frames F (X) and F(X+1) are shown as an example. As shown in FIG. 2, each grid may represent the chopper configuration in a subpixel, and "R", "G" and "B" refer to an arrangement of colors in the subpixel array. Based on the chopper technique, the first configuration may be denoted by "+" and the second configuration may be denoted by "–".

In this example, as for each subpixel, one of the first configuration and the second configuration is applied in the image frame F (X) and the other is applied in the image frame F(X+1), so as to realize the chopper in temporal aspect. In addition, in an image frame, every two adjacent subpixels apply different configurations, so as to realize the chopper in spatial aspect. Since a slightly higher output voltage $V_{OUT}$ and a slightly lower output voltage $V_{OUT}$ caused by the voltage offset of the SOP are output under the first configuration and the second configuration respectively and alternately, these slight deviations will be averaged out over a long-term display, to generate accurate display brightness in visual effects. Therefore, the chopper effect may be realizable under a high frame rate such as 60 Hz or 120 Hz, where the brightness deviation caused by the voltage offset in each image frame may not be easily perceived by human eyes under high-speed switching of image frames.

Figure 3A:
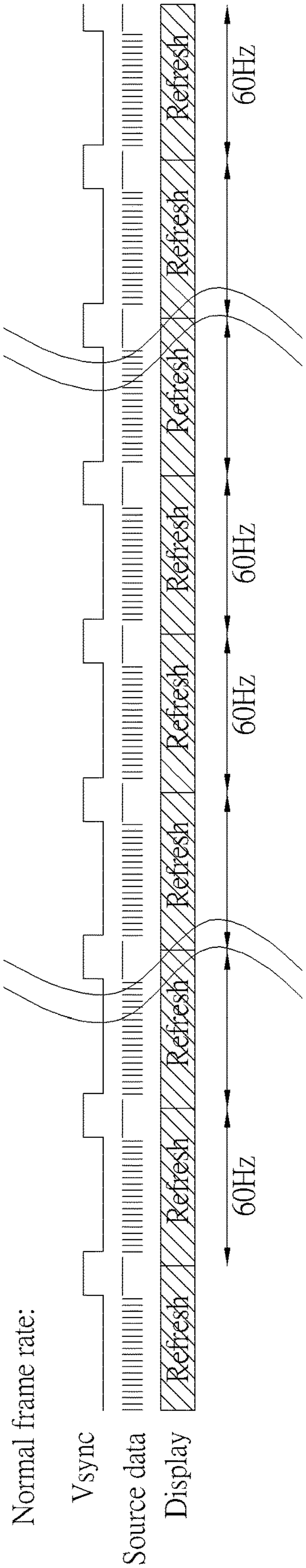
FIG. 3A is a waveform diagram illustrating the operations of a driving circuit under a normal frame rate.

FIG. 3A is a waveform diagram illustrating the operations of a driving circuit, which is configured to drive a display panel to perform display by outputting source data voltages to the display elements on the display panel. In an embodiment, the driving circuit may be a display driver integrated circuit (DDIC). A vertical synchronization signal Vsync, a source data output, and a display operation are shown in FIG. 3A. The vertical synchronization signal Vsync includes a series of periodic pulses. Each of the pulses indicates the start of a frame period, which indicates a time period in which an image frame is to be displayed. The source data output shows whether a specific SOP of the driving circuit outputs data voltages to the display panel in each frame period. The display operation indicates whether the display panel is refreshed or not in each frame period.

As shown in FIG. 3A, the vertical synchronization signal Vsync may be applied to allocate a frame period, which may be equal to 16.6 milliseconds (ms). FIG. 3A shows a normal frame rate of 60 Hz, where the data voltages are output and the display panel is refreshed in every frame period. With the 60 Hz frame rate where the display panel is refreshed in every frame period, the display images are updated rapidly and thus the brightness deviation caused by the voltage offset under the chopper operation is not easily seen by human eyes.

Figure 3B:
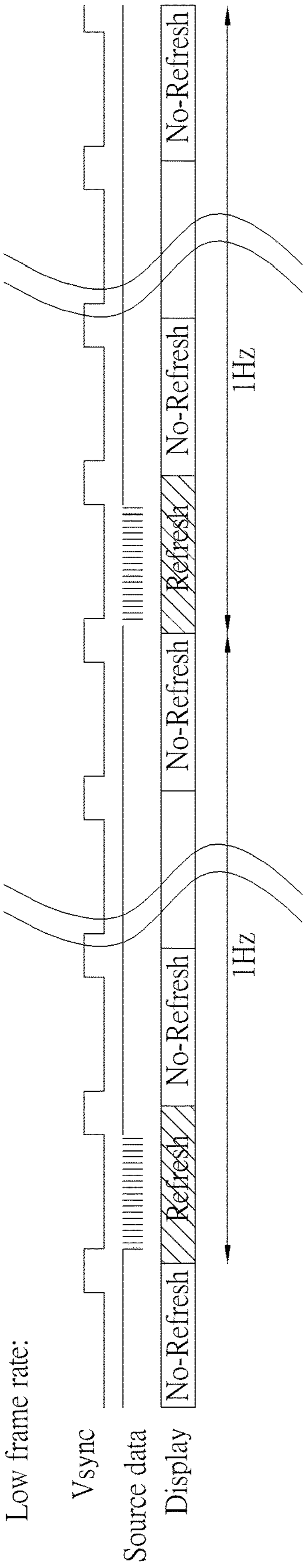
FIG. 3B is a waveform diagram illustrating a low frame rate operation of the driving circuit implemented by using a frame skip technique.

As mentioned above, if the panel displays with an extremely low frame rate such as 1 Hz or 0.016 Hz, the same image will stay on the panel too long such that the brightness deviation caused by the voltage offset might be easily seen with the usage of chopper technique. For example, FIG. 3B illustrates a low frame rate operation of the driving circuit implemented by using a frame skip technique, where the display panel may be refreshed in every 1 of 60 consecutive frame periods to realize 1 Hz frame rate. In such a situation, the same image will stay on the display panel until the next time the display panel is refreshed.

The brightness deviation caused by the voltage offset may be mitigated by increasing the bias current of the SOP, where an increase of the circuit area of the driving circuit is not necessary. FIGS. 4A and 4B illustrate a comparison of the chopper effect realized under different bias currents. FIG. 4A illustrates the situation of a low bias current, which may correspond to high brightness deviation. It can be seen from FIG. 4A that the brightness difference caused by the voltage offset of the SOP is more evident between the configurations "+" and "–". In contrast, FIG. 4B illustrates the situation of a high bias current, which may correspond to low brightness deviation. The voltage offset may be decreased with the increase of the bias current. Therefore, it can be seen from FIG. 4B that the brightness difference caused by the voltage offset of the SOP between the configurations "+" and "–" becomes less evident than the case of low bias current shown in FIG. 4A.

In an exemplary embodiment, if the SOP is in a low bias current configuration, the voltage offset may be approximately equal to 50 mV; and if the SOP is in a high bias current configuration having a larger bias current value, the voltage offset may be decreased to approximately 10 mV.

However, the increase of bias current value is usually accompanied by higher power consumption. Note that the power consumption of the display driving circuit is mainly generated from the SOPs for driving the display panel. Thus, if the high bias current configuration is always applied in the SOPs of the driving circuit, the overall power consumption of the driving circuit may increase dramatically.

Therefore, the present invention provides a novel method of changing the bias current of the SOPs under a dynamically changed frame rate. Under a high frame rate or normal frame rate, the SOPs may be in a low bias current configuration to achieve the visual effects of averaging out the brightness deviation under the chopper application, while keeping low power consumption to achieve satisfactory power saving effects. Under a low frame rate, the SOPs may be in a high bias current configuration to mitigate the visual effect problem that might be caused by the chopper operation. Since the panel is refreshed with an extremely low frequency, the high bias current configuration in the low frame rate will not evidently increase the power consumption. As a result, the overall power consumption may still be improved and the visual effect problem may be solved.

Figure 5:
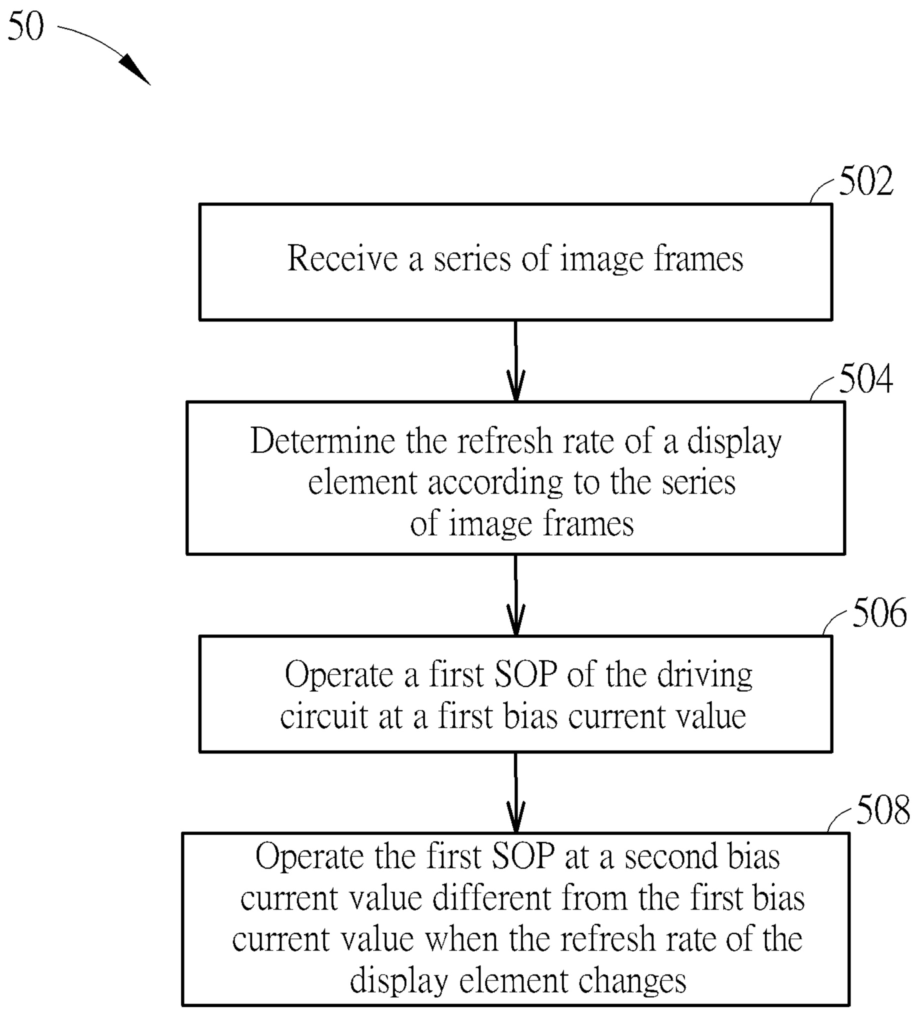
FIG. 5 is a flowchart of a driving process according to an embodiment of the present invention.

FIG. 5 is a flowchart of a driving process 50 according to an embodiment of the present invention. The driving process 50 may be implemented in a driving circuit for driving a display panel, such as a DDIC. The display panel may include multiple display elements. The driving circuit may include several SOPs used for driving the display elements on the display panel to perform display operations. As shown in FIG. 5, the driving process 50 includes the following steps:

Step 502: Receive a series of image frames.

Step 504: Determine the refresh rate of a display element according to the series of image frames.

Step 506: Operate a first SOP of the driving circuit at a first bias current value.

Step 508: Operate the first SOP at a second bias current value different from the first bias current value when the refresh rate of the display element changes.

According to the driving process 50, the driving circuit may receive a series of image frames (Step 502). According to the received image frames, the driving circuit may determine the refresh rate of one or more display elements on the display panel. Based on the refresh rate, the driving circuit may determine to operate the corresponding SOP at the first bias current value or the second bias current value. For example, as for a specific display element driven by the first SOP, the driving circuit may determine the refresh rate of this specific display element (Step 504). In a first image frame, the driving circuit may operate the first SOP at the first bias current value (Step 506). In a subsequent second image frame, when the refresh rate of the specific display element changes, the driving circuit may operate the first SOP at a second bias current value which is different from the first bias current value (Step 508).

In an embodiment, the display element may refer to a pixel or subpixel on the display panel. More specifically, the display element may refer to a light emitting device included in a pixel or subpixel, where the light emitting device may be a light emitting diode (LED) or an organic LED (OLED), but not limited thereto.

Note that in the driving process 50, the bias current configuration of the SOP may be determined according to the refresh rate of the corresponding display element(s). The refresh rate herein is equivalent to the frame rate described in the above paragraphs. As mentioned above, a display panel may be operated in a normal frame rate such as 120 Hz or 60 Hz, or may be operated in a low frame rate such as 1 Hz or 0.016 Hz. The normal or low frame rate indicates the refresh number of times or the refresh frequency in a series of consecutive image frames. Therefore, the frame rate of the display panel is equivalent to the refresh rate of the display element(s) on the display panel. The terms "frame rate" and "refresh rate" will be used interchangeably in the following descriptions.

Referring back to FIGS. 4A and 4B, a higher bias current will result in a smaller voltage offset, and a lower bias current will result in a larger voltage offset. The higher bias current is preferably applied in a lower refresh rate, and the lower bias current is preferably applied in a higher refresh rate. Therefore, in the driving process 50, assuming that the first bias current value is smaller than the second bias current value, the first bias current value will generate a voltage offset in the first SOP which is greater than the voltage offset generated by the second bias current value. For example, a low bias current value may be applied when the corresponding display element is operated in 60 Hz or 30 Hz frame rate, and a high bias current value may be applied when the corresponding display element is operated in 1 Hz or 0.016 Hz frame rate. Alternatively or additionally, a medium bias current value may be applied to the SOP if there is a medium frame rate such as 15 Hz.

In an embodiment, when the specific display element is refreshed with a first refresh rate, the driving circuit may operate the first SOP at the first bias current value; and when the specific display element is refreshed with a second refresh rate, the driving circuit may operate the first SOP at the second bias current value. Assuming that the first refresh rate is higher than the second refresh rate, the first bias current value will be smaller than the second bias current value.

Figure 6:
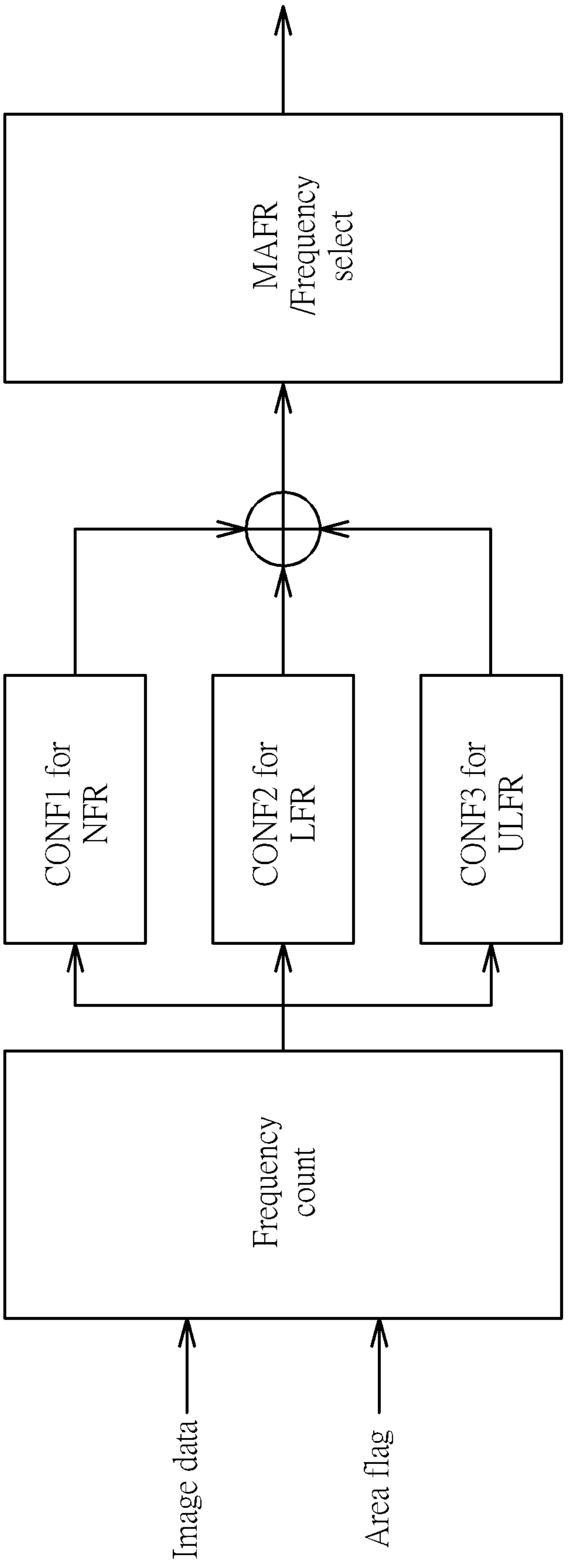
FIG. 6 is a flowchart of an algorithm executed by the driving circuit according to an embodiment of the present invention.

FIG. 6 is a flowchart of an algorithm executed by the driving circuit according to an embodiment of the present invention. When receiving the image data, the driving circuit may perform frequency count to determine the frame rate according to the image data, and then take an appropriate bias current configuration accordingly. In this embodiment, the SOP may have three selectable bias current configurations CONF1-CONF3. When the display operation is performed in a normal frame rate (NFR), the bias current configuration CONF1 which may have the minimum bias current value is applied. When the display operation is performed in a low frame rate (LFR), the bias current configuration CONF2 which may have a medium bias current value is applied. When the display operation is performed in an ultra-low frame rate (ULFR), the bias current configuration CONF3 which may have the maximum bias current value is applied. Subsequently, the driving circuit may output the data voltages corresponding to the received image data according to a selected frequency based on the corresponding frame rate information, and the SOPs apply the bias current configuration corresponding to the frame rate.

In an exemplary embodiment, the normal frame rate may be 60 Hz, the low frame rate may be 15 Hz, and the ultra-low frame rate may be 1 Hz. In fact, the numerical values of the frame rates are merely an example, and the normal frame rate, the low frame rate, and the ultra-low frame rate may have any appropriate values, which are not limited to those provided in this disclosure. As long as these frame rates satisfy the relations that the normal frame rate is greater than the low frame rate and the low frame rate is greater than the ultra-low frame rate, the bias current configurations may be feasible. With these frame rate allocations, the bias current values of these configurations CONF1-CONF3 will satisfy the relations that the bias current value of the configuration CONF1 is smaller than the bias current value of the configuration CONF2, which is further smaller than the bias current value of the configuration CONF3.

Figure 7:
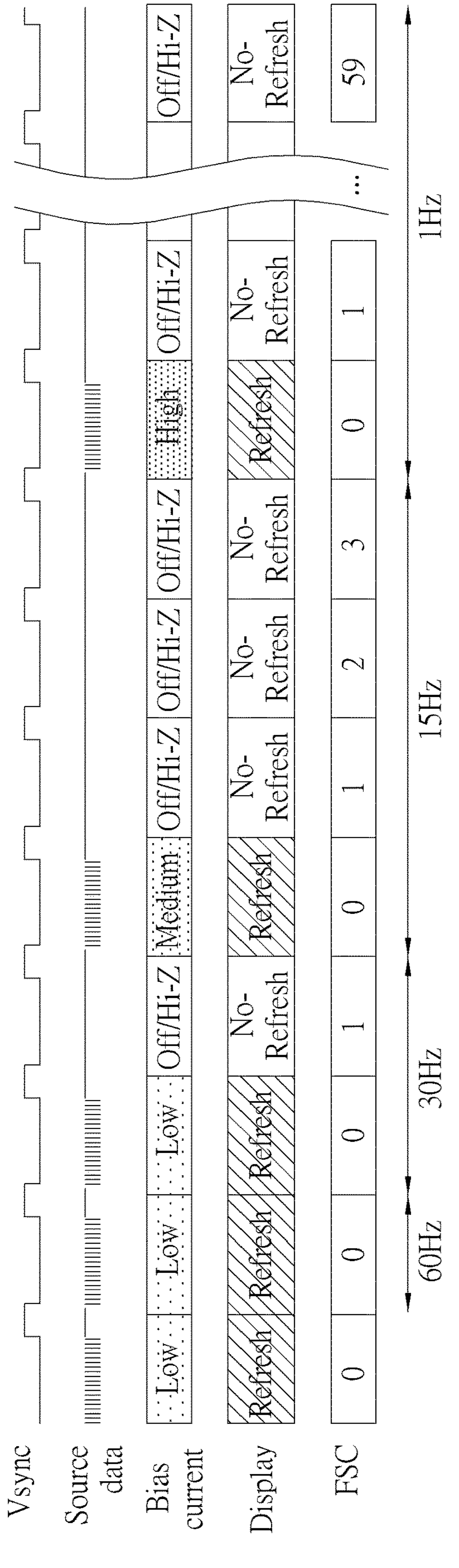
FIG. 7 illustrates an exemplary operation of a driving circuit under a variable frame rate according to an embodiment of the present invention.

FIG. 7 illustrates an exemplary operation of a driving circuit under a variable frame rate according to an embodiment of the present invention. Similarly, the vertical synchronization signal Vsync defines the frame periods by using a series of periodic pulses. In an embodiment, the vertical synchronization signal Vsync is equivalent to a tearing effect signal provided to the driving circuit from a timing controller. Similar to FIGS. 3A and 3B, the source data voltages and the related display operation are also shown in FIG. 7. FIG. 7 further illustrates a bias current configuration and a frame skip count FSC. The bias current configuration may be applied to one or more SOPs included in the driving circuit. The frame skip count FSC is a parameter used to determine the display operation, i.e., to determine whether each frame period has a refreshment or not.

In an exemplary embodiment, the bias current configuration may be applied to all SOPs of the driving circuit, and the display operation may indicate the refreshment of all display elements on the display panel. As shown in FIG. 7, the SOPs output data voltages when the display elements are refreshed, and stop outputting data voltages when the display elements are not refreshed. The counter of the frame skip count FSC may count consecutive non-refresh frame periods in the display sequence. In this embodiment, the display operation enters an extremely low frame rate 1 Hz from a normal frame rate 60 Hz, which has a gradually decreased frame rate configuration from 60 Hz to 30 Hz, 15 Hz, and then 1 Hz. Since the length of a frame period is 16.6 ms, the display elements are refreshed in every frame period under the frame rate 60 Hz. Under the frame rate 30 Hz, the display elements are refreshed in one frame period and then skipped (not refreshed) in the next frame period. Under the lower frame rate 15 Hz, the display elements are refreshed in one of every four frame periods. Under the ultra-low frame rate 1 Hz, the display elements are refreshed in one of every 60 frame periods.

In this embodiment, the driving circuit may be predetermined to operate in the display sequence having the dynamically decreased frame rates 60 Hz, 30 Hz, 15 Hz, and then 1 Hz, and thus may refresh the display elements with the frame rates accordingly. Therefore, the SOPs may apply the corresponding bias current configurations in different frame rates. In detail, as shown in FIG. 7, a low bias current configuration (e.g., CONF1) is applied under the frame rates 60 Hz and 30 Hz, a medium bias current configuration (e.g., CONF2) is applied under the frame rate 15 Hz, and a high bias current configuration (e.g., CONF3) is applied under the frame rate 1 Hz.

Note that in the non-refresh frame periods, since the SOPs need not to output data voltages, the bias current status of the SOPs may be off or in high impedance (Hi-Z), so as to prevent unnecessary power consumption generated from the bias current.

Therefore, when the driving circuit receives the input image data, it may obtain the setting of display sequence in subsequent several frame periods, and allocate the refresh frame periods and non-refresh frame periods according to the variation of frame rates in the display sequence. In such a situation, the driving circuit may set the bias current configuration of the SOPs accordingly. The SOPs may be operated by using appropriate bias current configurations in the corresponding frame periods under different frame rates, as shown in FIG. 7.

In another embodiment, the driving circuit may set the bias current configuration of the SOPs based on the counting result of a counter associated with the frame skip count FSC, which counts the consecutive non-refresh frame periods to determine the refresh rate. The SOPs are then operated at an appropriate bias current configuration according to the number of consecutive non-refresh frame periods indicated in the counting result, to be adapted to the change of the refresh rate.

Figure 8:
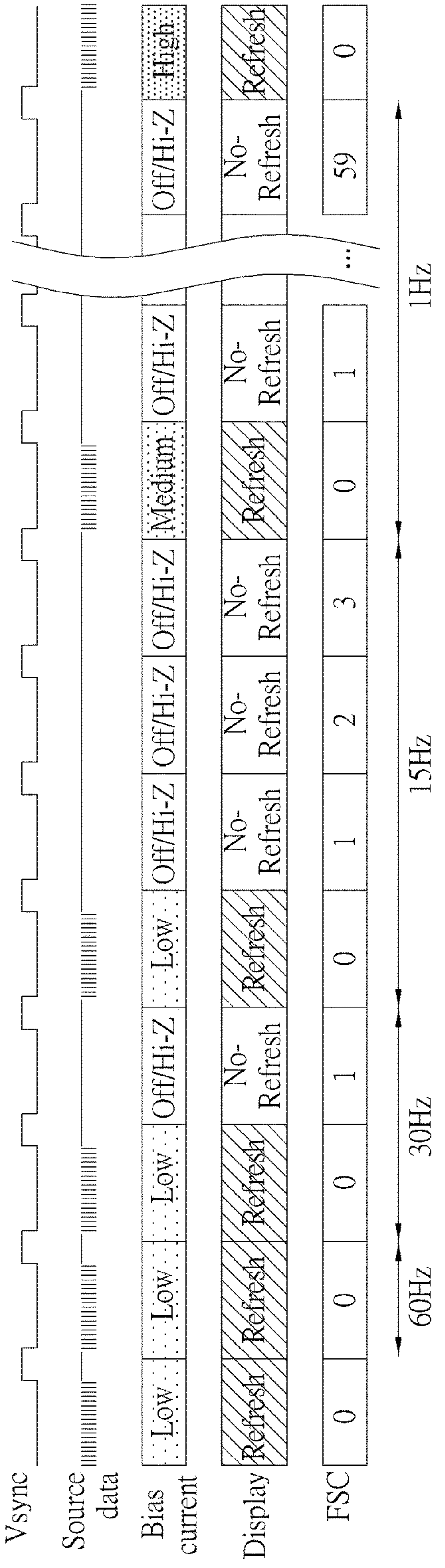
FIG. 8 illustrates another exemplary operation of a driving circuit under a variable frame rate according to an embodiment of the present invention.

FIG. 8 illustrates another exemplary operation of a driving circuit under a variable frame rate according to an embodiment of the present invention, where the counting result of the non-refresh frame periods is applied to obtain the bias current configuration. As shown in FIG. 8, the allocation of refresh frame periods and non-refresh frame periods is identical to that shown in FIG. 7. In this embodiment, the frame rate is in 60 Hz initially, and thus the SOPs are set to be operated at the low bias current configuration. The bias current configuration is obtained after the frame rate is determined according to the result of the frame skip count FSC, which determines the frame rate according to the counted number of consecutive non-refresh frame periods. When the driving circuit determines that there are 3 consecutive non-refresh frame periods (i.e., the frame skip count FSC outputs 1, 2 and 3 consecutively) and then enters a new refresh frame period (i.e., the frame skip count FSC returns to 0), the SOPs may determine that the frame rate becomes 15 Hz and apply the medium bias current configuration in this new frame period. In a similar manner, the SOPs may enter the high bias current configuration after the frame skip count FSC indicates that there are 59 consecutive non-refresh frame periods, which also indicates that the frame rate is equal to 1 Hz. In this embodiment, the bias current configuration may change later than the variation of frame rate, but may still achieve an improvement of visual effect over a long-term display.

In another embodiment, the driving circuit may implement the lower frame rates by entering a long-V mode. In this implementation, the back porch or front porch of display timing may be extended to increase the blanking period where no data voltage is output and no refreshment is performed, so as to realize the lower frame rates. Under the long-V mode, the length of the back porch or front porch may be variable and have any appropriate value, so that the frame rate may be set flexibly. Based on the operation of the long-V mode, the refreshment of display elements may not need to be skipped in an entire frame period. For example, if the maximum frame rate is 120 Hz, using the implementation of allocating non-refresh frame periods may realize 60 Hz frame rate by refreshing the display elements in every one of two frame periods, but it may not easily realize a 90 Hz frame rate. In comparison, the 90 Hz frame rate can be easily realized by controlling the display timing to extend the back porch or front porch to an appropriate length.

Figure 9:
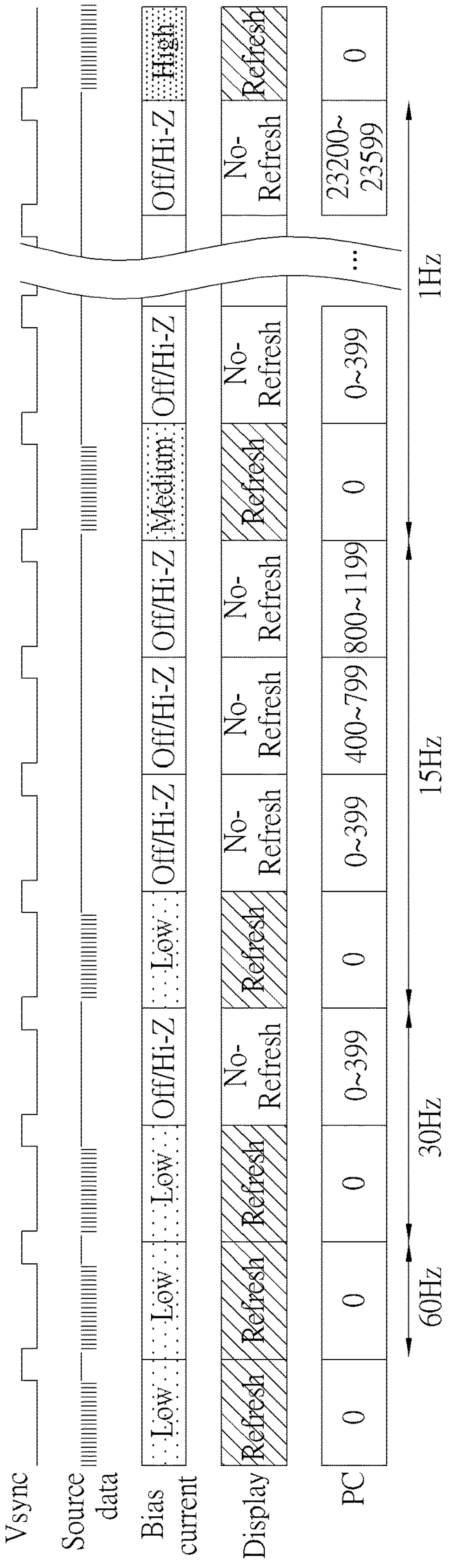
FIG. 9 illustrates an exemplary implementation of a driving circuit using the long-V mode to realize a variable frame rate according to an embodiment of the present invention.

FIG. 9 illustrates an exemplary implementation of a driving circuit using the long-V mode to realize a variable frame rate according to an embodiment of the present invention, where the driving circuit also drives the display panel with a display sequence having a gradually decreased frame rate configuration from 60 Hz to 30 Hz, 15 Hz and 1 Hz. In this embodiment, different frame rates may be realized by using different porch lengths. As shown in FIG. 9, each frame period may include 400 line times, and a porch count PC is applied to count the line times in the non-refresh frame periods. A line time may refer to a time period in which a line of pixels on the display panel are scanned.

In an embodiment, the bias current configuration may be determined based on the predefined frame rates in the display sequence. That is, a low bias current configuration (e.g., CONF1) is applied under the frame rates 30 Hz and 60 Hz, a medium bias current configuration (e.g., CONF2) is applied under the frame rate 15 Hz, and a high bias current configuration (e.g., CONF3) is applied under the frame rate 1 Hz.

In another embodiment, the bias current configuration may be performed by using the counting result of a counter associated with the porch count PC, which counts the line times in the non-refresh frame periods. The SOPs of the driving circuit may be operated at a selected bias current configuration according to the counting result of the line times. For example, as shown in FIG. 9, if the value of the porch count PC reaches 1199 and then returns to 0, the driving circuit may determine that the present frame rate may be 15 Hz, and thereby set the bias current configuration to the medium level in the next refresh frame period. In a similar manner, the SOPs may enter the high bias current configuration after the porch count PC reaches 23599 and then returns to 0. The detailed implementations of porch counting are similar to those associated with frame counting as illustrated in FIG. 8, and will be omitted herein.

Note that the numerical value and related implementation of the porch count PC shown in FIG. 9 is merely an example for illustrating the operations for counting line times in a non-refresh period to determine the frame rate of the display panel. In fact, there may be a back porch and a front porch in each display frame period defined by the vertical synchronization signal Vsync. In order to simplify the illustrations, the porch in those refresh frame periods is omitted in FIG. 9. Since there are usually at most several tens of line times included in the porch of the refresh frame periods, the counted porch line time in the refresh frame periods is usually small and may be omitted without influencing the illustrations of the present embodiment. In an embodiment, the porch counter is only active in non-refresh frame periods, and may be set to 0 to stop counting in refresh frame periods. While a first non-refresh frame period starts right after the end of a refresh frame period, the porch count may be reset to 0 and restart to count from 0.

Referring back to FIG. 5, in the driving process 50, the first SOP may be applied to drive a display element, and thus the bias current of the first SOP is determined according to the refresh rate of this display element. Alternatively or additionally, the first SOP may be configured to drive multiple display elements, and thus the bias current of the first SOP may be determined according to the refresh rate of these display elements driven by the first SOP. A skilled person would know that an SOP of the driving circuit is configured to drive one or more columns of subpixels on the display panel. In such a situation, this SOP will be operated at different bias current values based on the refresh rates of these subpixels. If these subpixels have different refresh rates, the SOP will be operated at different bias current values for driving these subpixels.

For example, if the display element(s) driven by the first SOP have a first refresh rate in a first time interval, the first SOP may be operated at a first bias current value to refresh the display element(s) in the first time interval; and if the display element(s) driven by the first SOP have a second refresh rate in a second time interval, the first SOP may be operated at a second bias current value to refresh the display element(s) in the second time interval.

In an exemplary embodiment, the first refresh rate may be a normal refresh rate such as 60 Hz or 30 Hz, and thus the first SOP may have a low bias current configuration with a lower bias current value. The second refresh rate may be a low refresh rate such as 1 Hz, and thus the first SOP may have a high bias current configuration with a higher bias current value.

Figure 10:
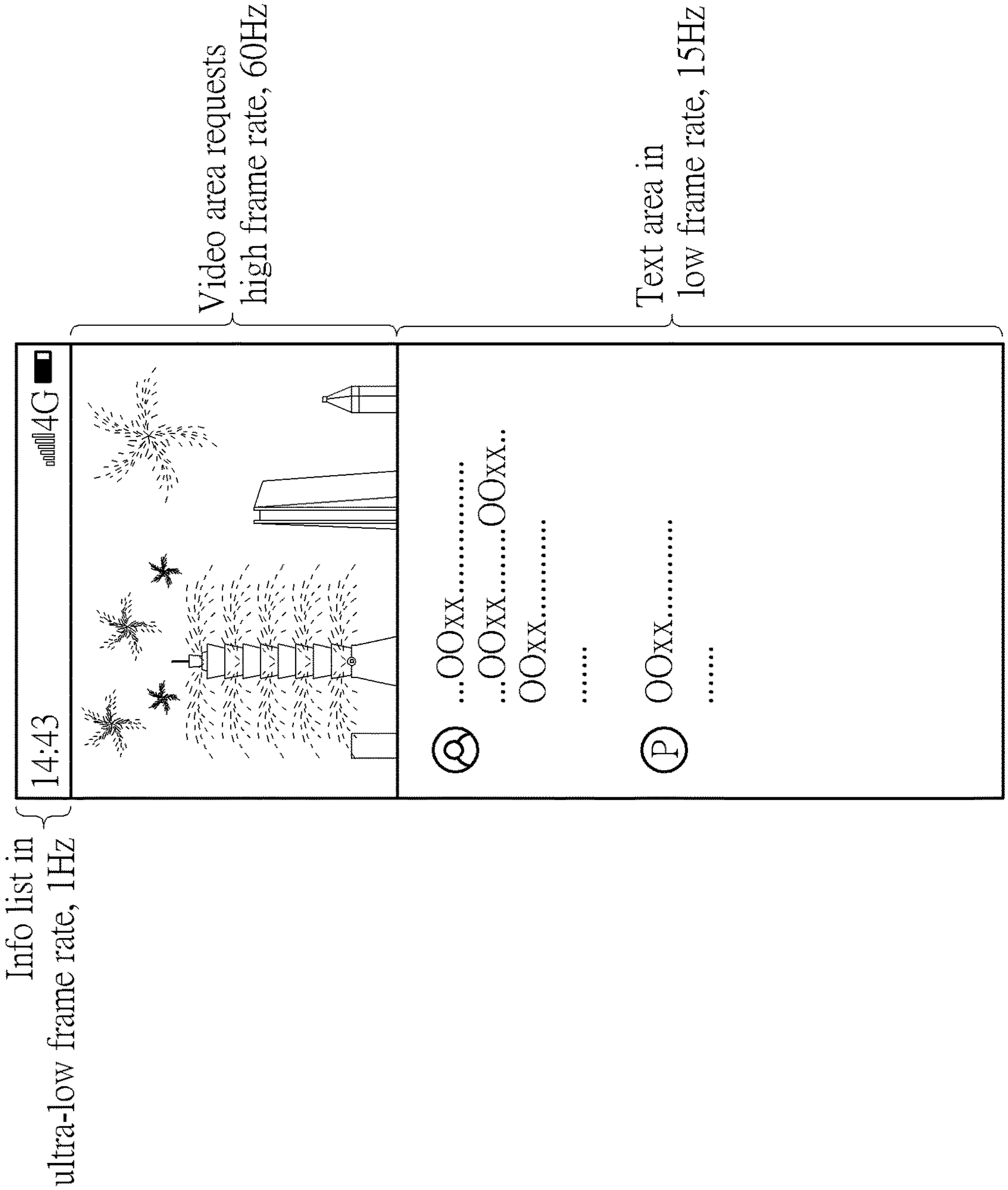
FIG. 10 illustrates an image frame of the display panel divided into multiple areas allocated with different frame rates.

In an embodiment, the driving circuit may drive the display panel under a multi-area frame rate (MAFR) application, where an image frame of the display panel may be divided into multiple areas which are allocated with different frame rates. For example, as shown in FIG. 10, the display panel may include an information list, a video area and a text area. The video area is requested to be displayed with a higher frame rate to keep the video quality. The text area where high video quality is unnecessary is preferably displayed with a lower frame rate in order to save power consumption. The top information list merely shows time, battery or other static information, and thus the image content of the information list may not change frequently and could be displayed with an ultra-low frame rate. In this embodiment, the video area may be refreshed in a high frame rate or normal frame rate such as 60 Hz, the text area may be refreshed in a low frame rate such as 15 Hz, and the top information list may be refreshed in an ultra-low frame rate such as 1 Hz.

As mentioned above, an SOP of the driving circuit may be configured to drive one or multiple columns of display elements on the display panel, which may be allocated to different areas configured with different frame rates. For example, a first SOP may be configured to drive multiple display elements on the display panel, which may include a first display element and a second display element at different locations of the display panel. Therefore, when the first display element is refreshed, the first SOP may be operated at a first bias current value for driving the first display element; and when the second display element is refreshed, the first SOP may be operated at a second bias current value for driving the second display element. If the first display element and the second display element are in the same area with the same frame rate, the first bias current value may be identical to the second bias current value. If the first display element and the second display element are in different areas configured with different frame rates, the first bias current value may be different from the second bias current value.

Note that there may be multiple driving channels included in the driving circuit. Therefore, the driving circuit may have multiple SOPs for driving multiple columns of display elements on the display panel. In an embodiment, the driving circuit may have a first SOP and a second SOP implemented in different driving channels. Correspondingly, the display panel may include multiple display elements, among which a first display element may correspond to the first SOP (e.g., may be driven by the first SOP) and a second display element may correspond to the second SOP (e.g., may be driven by the second SOP). In such a situation, when the first display element is refreshed, the first SOP may be operated at a first bias current value to be adapted to the refresh rate of the first display element; and when the second display element is refreshed, the second SOP may be operated at a second bias current value to be adapted to the refresh rate of the second display element. Under an MAFR application, the first display element and the second display element may be in different areas configured with different frame rates; hence, the first bias current value may be different from the second bias current value.

Referring back to FIG. 6, when the MAFR is applied, in addition to the input image data, the driving circuit may also receive one or more area flags, which define the areas having different frame rates. Therefore, the SOPs for driving each area may be configured correspondingly, to select different bias current configurations for different areas in one frame period based on the frame rates in these areas under the MAFR implementation.

In an embodiment, the driving circuit may receive the area flag(s) from a front-end video provider when receiving the video/image data. Alternatively, the driving circuit may generate the area flag(s) according to the video/image content and/or the refreshing status indicated by the video/image data received from the video provider.

Figure 11:
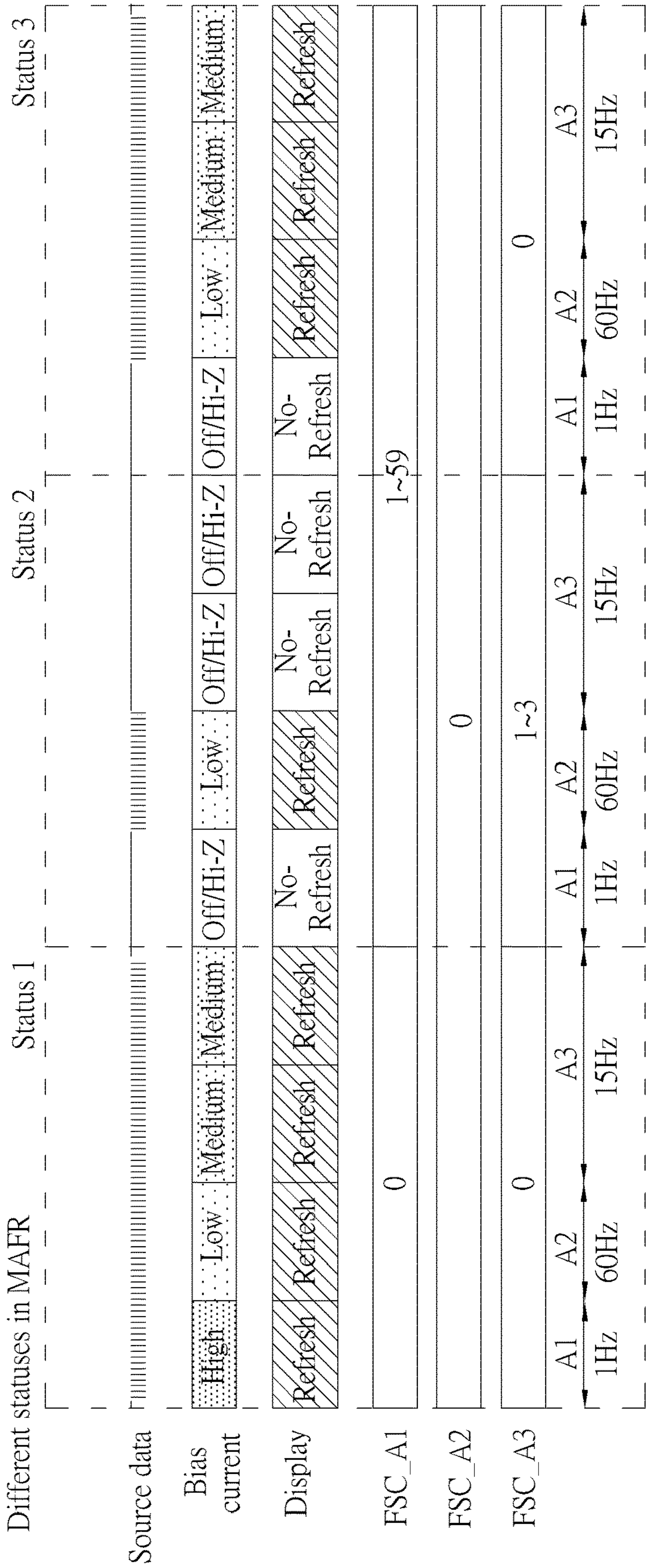
FIG. 11 illustrates an exemplary operation of a driving circuit under a variable frame rate with an MAFR application according to an embodiment of the present invention.

FIG. 11 illustrates an exemplary operation of a driving circuit under a variable frame rate with an MAFR application according to an embodiment of the present invention. The MAFR configuration of the display panel is similar to that shown in FIG. 10, where the display panel is divided into three areas A1-A3. The area A1 (which may show an information list) is refreshed in 1 Hz, the area A2 (which may be a video area) is refreshed in 60 Hz, and the area A3 (which may be a text area) is refreshed in 15 Hz. Therefore, 3 frame skip counts FSC_A1, FSC_A2 and FSC_A3 are applied to count the non-refresh frame periods in the corresponding areas A1-A3, respectively.

As shown in FIG. 11, based on the allocation of frame rates in the MAFR application, each image frame may apply one of 3 statuses. Status 1 is that all display elements in the image frame is refreshed, Status 2 is that only the area A2 of the image frame is refreshed, and Status 3 is that the areas A2 and A3 of the image frame are refreshed but the area A1 is not refreshed.

In an embodiment, the first image frame may apply Status 1 for refreshing. Since only the area A2 is always refreshed, the second image frame may apply Status 2 for refreshing, and the frame skip counts FSC_A1 and FSC_A3 of other two areas A1 and A3 start to accumulate in subsequent non-refresh frame periods. After the frame skip count FSC_A3 indicates 3 consecutive frame periods without refresh in the area A3, the next image frame will enter Status 3, while the frame skip count FSC_A1 keeps accumulating. Subsequently, the next image frame returns to Status 2 and then the frame skip count FSC_A3 restarts to accumulate from 0.

Similarly, after the frame skip count FSC_A1 indicates 59 consecutive frame periods without refresh in the area A1, the next image frame will enter Status 1. The display operation then repeats the same sequence in every 60 consecutive image frames, until the frame rate setting changes.

Figure 12:
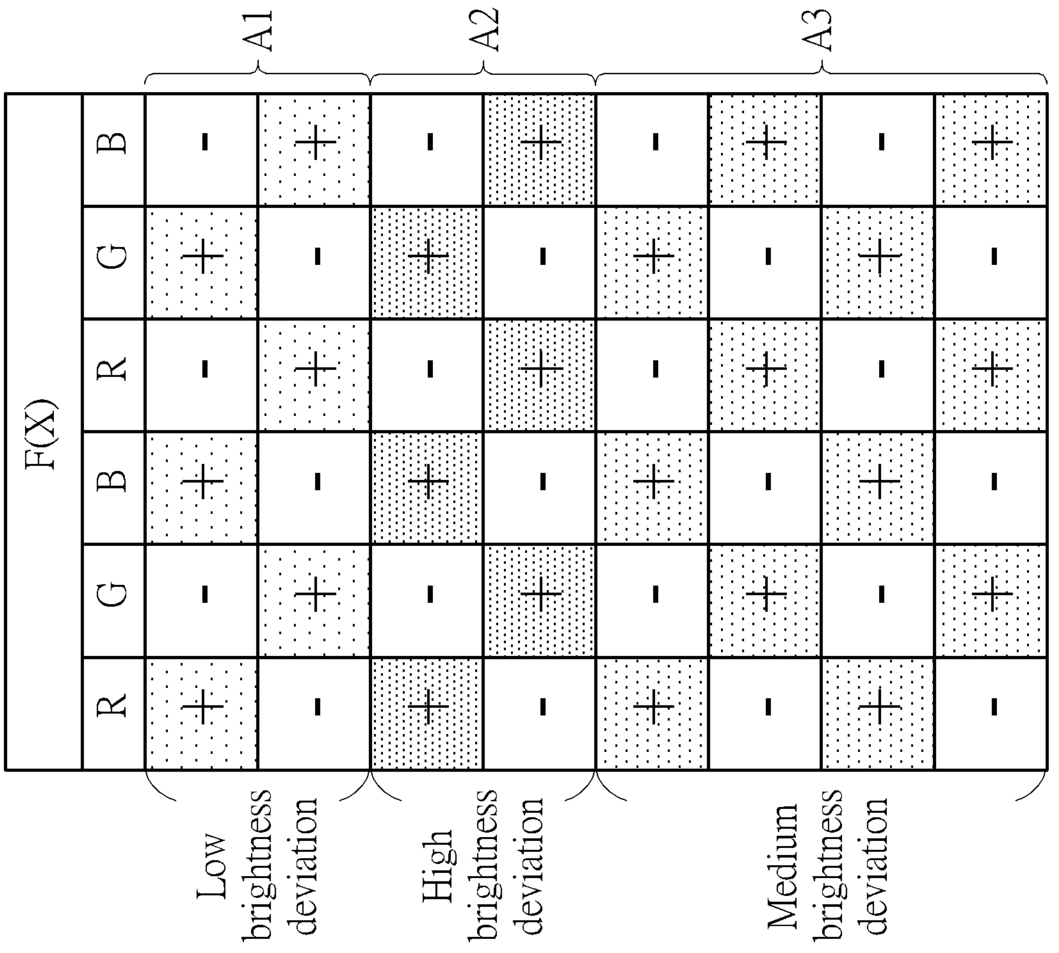
FIG. 12 illustrates the brightness deviations resulting from the voltage offset of the chopper in the MAFR application.

Based on the above status changing operations, different frame rates may be realized in different areas of an image frame, and thus different bias current configurations may be applied to generate different brightness deviations in different areas, to be adapted to the frame rate values in different areas under the chopper operation. The brightness deviations resulting from the voltage offset of the chopper in an image frame F (X) are shown in FIG. 12, where the SOPs for driving the area A1 may be applied with the maximum bias current value to achieve lower brightness deviation since the area A1 has the minimum frame rate, and the SOPs for driving the area A2 may be applied with the minimum bias current value, which may cause higher brightness deviation since the area A2 has the maximum frame rate. In addition, the SOPs for driving the area A3 may be applied with a medium bias current value, which is accompanied by medium brightness deviation.

Figure 13:
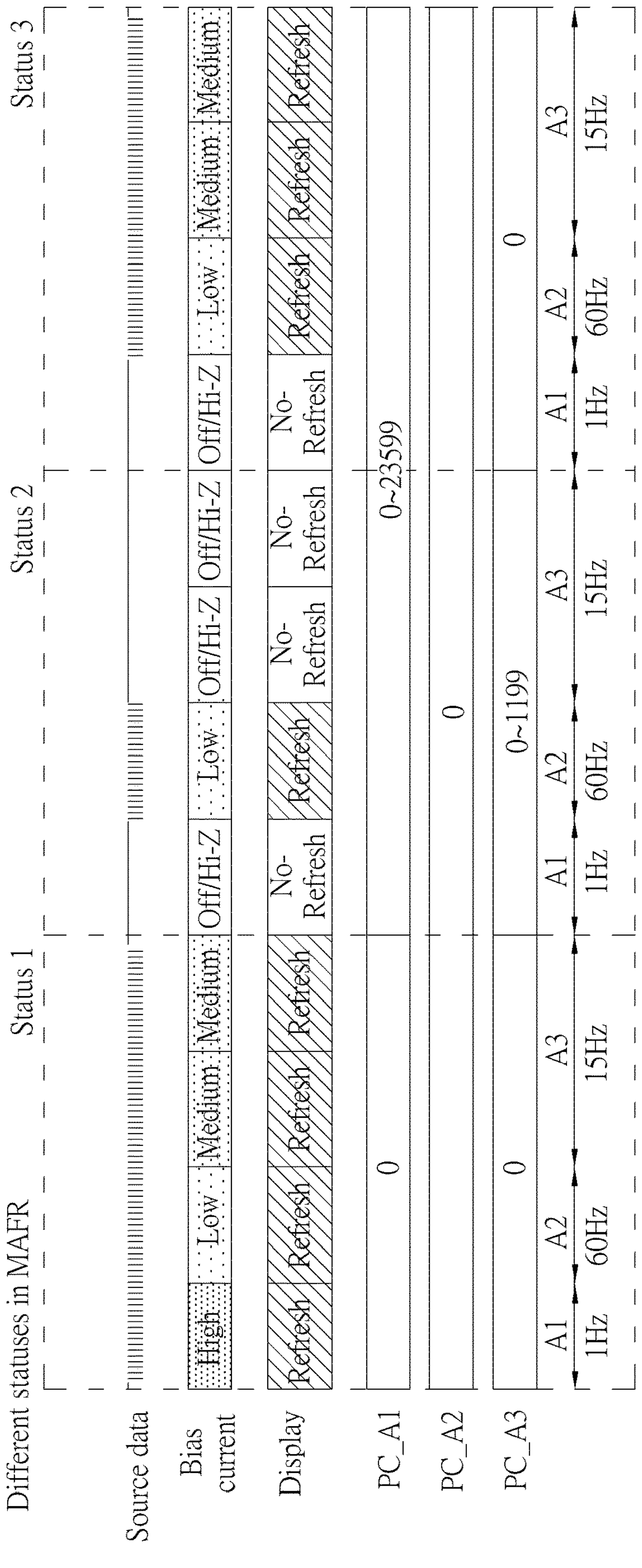
FIG. 13 illustrates the MAFR implementations applied to the long-V mode according to an embodiment of the present invention.

Note that the MAFR implementations may also be applicable to the long-V mode, as shown in FIG. 13, where the variable frame rate is realized by using extended porch length. In this embodiment, three porch counts PC_A1, PC_A2 and PC_A3 are applied to count the non-refresh line times in the areas A1-A3, respectively. The operations of line time counting under the MAFR application are similar to the operations of non-refresh frame period counting under the MAFR application, where each area with a specific frame rate has a corresponding counter. Those skilled in the art may refer to the above paragraphs to obtain its detailed operations, which will not be repeated herein.

Similarly, in the MAFR application, the bias current configurations may be set in the SOPs for different areas based on a predefined frame rate allocation obtained from the input image data, or alternatively, may be set by using the counting result of the non-refresh (skip) frame counters or porch counters.

Figure 14:
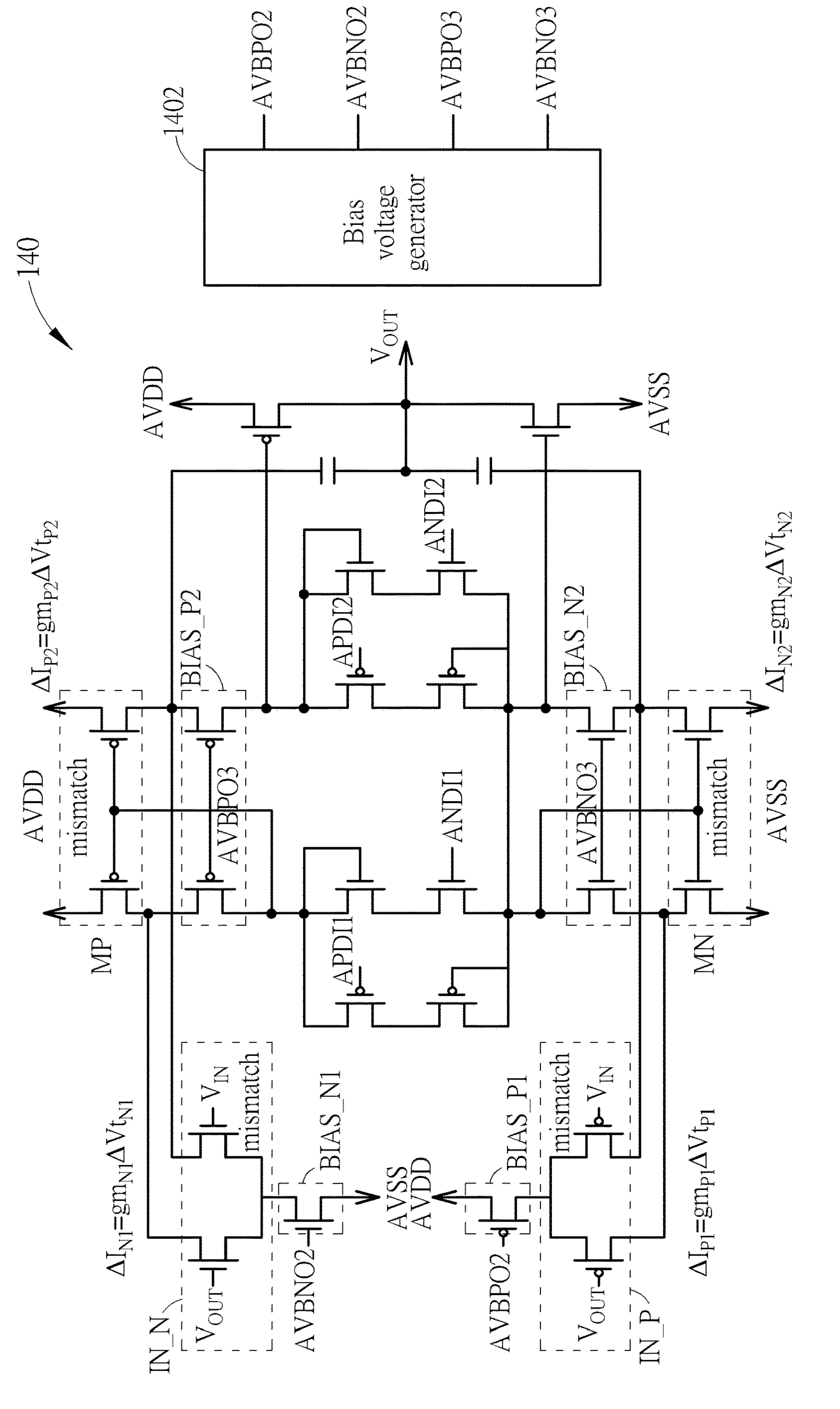
FIG. 14 is a schematic diagram of an SOP according to an embodiment of the present invention.

Note that the bias current configuration may determine the brightness deviation caused by the voltage offset of the SOP. FIG. 14 is a schematic diagram of an SOP 140 according to an embodiment of the present invention. The SOP 140 may be composed of two input stages, a gain stage and an output stage, and may be operated by receiving power supply voltages AVDD and AVSS.

In detail, the input stages include two differential input pairs IN_P and IN_N and two bias control circuits BIAS_P1 and BIAS_N1. The differential input pairs IN_P and IN_N may receive an input signal $V_{IN}$ of the SOP 140, and may also be coupled to the output terminal of the SOP 140 to receive an output voltage $V_{OUT}$ of the SOP 140, so as to realize an output buffer for driving the display elements. As shown in FIG. 14, the bias control circuit BIAS_P1 is configured to supply a bias current to the differential input pair IN_P, where the bias current may be generated by receiving a bias voltage AVBPO2. The bias control circuit BIAS_N1 is configured to supply a bias current to the differential input pair IN_N, where the bias current may be generated by receiving a bias voltage AVBNO2. The bias control circuits BIAS_P1 and BIAS_N1 may be coupled to a bias voltage generator 1402, to receive the bias voltages AVBPO2 and AVBNO2, respectively.

The gain stage of the SOP 140 includes two current source pairs MP and MN and two bias control circuits BIAS_P2 and BIAS_N2. The current source pairs MP and MN, which are coupled to the input pairs IN_N and IN_P, respectively, may provide an operating current for the gain stage of the SOP 140. As shown in FIG. 14, each of the current source pairs MP and MN may be implemented by using a current mirror. The bias control circuit BIAS_P2 is configured to supply a bias current to the current source pair MP, where the bias current may be generated by receiving a bias voltage AVBPO3. The bias control circuit BIAS_N2 is configured to supply a bias current to the current source pair MN, where the bias current may be generated by receiving a bias voltage AVBNO3. The bias control circuits BIAS_P2 and BIAS_N2 may be coupled to the bias voltage generator 1402 (or alternatively another bias voltage generator), to receive the bias voltages AVBPO3 and AVBNO3, respectively.

The SOPs described in the above embodiments may have the structure as shown in FIG. 14, where the bias current configuration of the SOP may be implemented by modifying the bias voltages of the SOP. For example, in order to drive the display elements on the display panel, the bias current generated by any of the bias control circuits BIAS_P1, BIAS_N1, BIAS_P2 and BIAS_N2 may be adjusted when the refresh rate of the display elements driven by the SOP 140 changes. The adjustment may be realized by modifying the bias voltages AVBPO2, AVBNO2, AVBPO3 and/or AVBNO3.

For example, the bias current generated by the bias control circuit BIAS_P1 may be adjusted to be adapted to the refresh rate of a display element driven by the SOP 140. If the display element is refreshed with a first refresh rate, the bias current generated by the bias control circuit BIAS_P1 may have a first value; and if the display element is refreshed with a second refresh rate different from the first refresh rate, the bias current generated by the bias control circuit BIAS_P1 may have a second value different from the first value. In a similar way, the bias currents generated by the bias control circuits BIAS_N1, BIAS_P2 and/or BIAS_N2 may be adjusted to be adapted to the refresh rate of the display element.

As mentioned above, a higher bias current will result in a smaller voltage offset and thus is preferably applied under a lower refresh rate, and a lower bias current will result in a larger voltage offset and thus is preferably applied under a higher refresh rate. In such a situation, if the first refresh rate is greater than the second refresh rate, the first value of the bias current may be smaller than the second value of the bias current.

In detail, the SOP 140 may have an offset voltage $V_{OS}$, which is generated from the mismatch of the input stages and/or the gain stage. As shown in FIG. 14, the mismatch of the input stages may include $\Delta I_{P1}$ generated from the differential input pair IN_P and $\Delta I_{N1}$ generated from the differential input pair IN_N, and the mismatch of the gain stage may include $\Delta I_{P2}$ generated from the current source pair MP and $\Delta I_{N2}$ generated from the current source pair MN. With these mismatches, the offset voltage $V_{OS}$ of the SOP 140 may be calculated as:

$$V_{OS} = \frac{\Delta I_{N1} + \Delta I_{P1} + \Delta I_{N2} + \Delta I_{P2}}{gm_{N1} + gm_{P1}} = \frac{(gm_{N1}\Delta Vt_{N1}) + (gm_{P1}\Delta Vt_{P1}) + (gm_{N2}\Delta Vt_{N2}) + (gm_{P2}\Delta Vt_{P2})}{gm_{N1} + gm_{P1}};$$

where $gm_{N1}$ is the transconductance of the differential input pair IN_N, $gm_{P1}$ is the transconductance of the differential input pair IN_P, $gm_{N2}$ is the transconductance of the current source pair MN, $gm_{P2}$ is the transconductance of the current source pair MP, $\Delta Vt_{N1}$ is the threshold voltage mismatch of the differential input pair IN_N, $\Delta Vt_{P1}$ is the threshold voltage mismatch of the differential input pair IN_P, $\Delta Vt_{N2}$ is the threshold voltage mismatch of the current source pair MN, and $\Delta Vt_{P2}$ is the threshold voltage mismatch of the current source pair MP.

In an embodiment, according to the above equation, in order to reduce the offset voltage $V_{OS}$, the transconductances $gm_{P2}$ and $gm_{N2}$ of the current source pairs MP and MN may be decreased, which may be achieved by increasing the bias current of the current source pairs MP and MN in the gain stage. In such a situation, the bias current may be increased by increasing the bias voltage AVBNO3 and/or decreasing the bias voltage AVBPO3. Alternatively or additionally, the increase of the bias current in the gain stage may be achieved by adjusting other bias voltages APDI1, ANDI1, APDI2, and/or ANDI2 output to the gain stage.

The reduction of the offset voltage $V_{OS}$ may be realized in other manners. For example, according to the above equation, the offset voltage $V_{OS}$ is also associated with the transconductances $gm_{P1}$ and $gm_{N1}$ of the differential input pairs IN_P and IN_N, and thus the tail currents of these input pairs IN_P and IN_N may be modified to reduce the offset voltage $V_{OS}$. In other words, the bias currents generated by the bias control circuits BIAS_P1 and BIAS_N1 may be modified to reduce the offset voltage $V_{OS}$.

In another embodiment, the bias current for the current source pairs MN and MP may be modified by adjusting the width-length ratio of the transistors and/or changing the number of transistor units used to implement the elements included in the current source pairs MN and MP. Various implementations for modifying the voltage offset value may be applied to the embodiments of the present invention to realize different bias current configurations of the SOP under different refresh rates, and these implementations should belong to the scope of the present invention.

To sum up, the present invention provides a novel driving method for a display panel and a related SOP implemented in the driving circuit for driving the display panel. The driving circuit may apply a chopper technique to remove the brightness deviation generated from the voltage offset of the SOPs by setting different chopper configurations/polarities and averaging the output data voltages in adjacent subpixels and/or frame periods in visual effects. However, the brightness deviation may be evident and easily perceived by human eyes under a low frame rate, and this brightness deviation may be mitigated by increasing the bias current of the SOP. Therefore, in order to achieve a preferable visual effect while keeping satisfactory power consumption, in the driving circuit for the display panel, the SOPs may be dynamically switched between different bias current configurations as the frame rate changes. More specifically, under a lower frame rate, a higher bias current value may be applied to mitigate the brightness deviation generated by the voltage offset with chopper; and under a normal or higher framer rate, a lower bias current value may be applied to save power consumption. In an embodiment, the MAFR application requires different frame rates in different areas of an image frame. Therefore, the corresponding bias current configurations may be allocated to the SOPs for driving the areas having different frame rates. As a result, the bias current configurations may be different between different frame periods and/or between different SOPs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving method comprising:

providing a source operational amplifier (SOP) to drive a display element;

operating the SOP at a first bias current value in response to the display element being refreshed with a first refresh rate; and operating the SOP at a second bias current value different from the first bias current value in response to the display element being refreshed with a second refresh rate different from the first refresh rate, wherein the first refresh rate is greater than the second refresh rate, and the first bias current value is smaller than the second bias current value.

2. The driving method of claim 1, wherein the first bias current value results in a voltage offset of the SOP greater than a voltage offset of the SOP resulted from the second bias current value.

3. The driving method of claim 1, wherein the SOP is comprised in a driving circuit, and the driving method further comprises:

receiving, by the driving circuit, a series of image frames;

determining a refresh rate of the display element according to the series of image frames; and operating the SOP at the first bias current value or the second bias current value according to the refresh rate.

4. The driving method of claim 3, wherein the step of determining the refresh rate of the display element according to the series of image frames comprises:

counting non-refresh frames to determine the refresh rate of the display element.

5. The driving method of claim 4, wherein the step of operating the SOP at the first bias current value or the second bias current value according to the refresh rate comprises:

operating the SOP at the first bias current value or the second bias current value according to a number of consecutive non-refresh frames.

6. The driving method of claim 3, wherein the step of determining the refresh rate of the display element according to the series of image frames comprises:

counting line times in a non-refresh period to determine the refresh rate of the display element.

7. The driving method of claim 6, wherein the step of operating the SOP at the first bias current value or the second bias current value according to the refresh rate comprises:

operating the SOP at the first bias current value or the second bias current value according to a number of line times in the non-fresh period.

8. A driving method for driving a plurality of display elements, comprising:

providing a source operational amplifier (SOP) to drive the plurality of display elements;

operating the SOP at a first bias current value in response to a first display element among the plurality of display elements being refreshed with a first refresh rate; and operating the SOP at a second bias current value different from the first bias current value in response to a second display element among the plurality of display elements being refreshed with a second refresh rate different from the first refresh rate, wherein the first refresh rate is greater than the second refresh rate, and the first bias current value is smaller than the second bias current value.

9. The driving method of claim 8, wherein the first display element and the second display element are different display elements at different locations on a display panel, and the steps of operating the SOP comprise:

operating the SOP at the first bias current value for driving the first display element; and operating the SOP at the second bias current value for driving the second display element.

10. The driving method of claim 8, wherein the steps of operating the SOP comprise:

operating the SOP at the first bias current value in a first time interval to refresh one or more display elements among the plurality of display elements with the first refresh rate; and operating the SOP at the second bias current value in a second time interval to refresh the one or more display elements with the second refresh rate.

11. A driving circuit comprising:

a source operational amplifier (SOP), configured to drive a plurality of display elements;

wherein the SOP is operated at a first bias current value in response to a first display element among the plurality of display elements being refreshed with a first refresh rate and operated at a second bias current value different from the first bias current value in response to a second display element among the plurality of display elements being refreshed with a second refresh rate different from the first refresh rate, wherein the first refresh rate is greater than the second refresh rate, and the first bias current value is smaller than the second bias current value.

12. The driving circuit of claim 11, wherein the first display element and the second display element are the same display element of a display panel.

13. The driving circuit of claim 11, wherein the first display element and the second display element are different display elements at different locations on a display panel.

14. The driving circuit of claim 13, wherein the SOP is operated at the first bias current value for driving the first display element, and operated at the second bias current value for driving the second display element.

15. The driving circuit of claim 11, wherein the SOP is operated at the first bias current value in a first time interval to refresh one or more display elements among the plurality of display elements with the first refresh rate, and operated at the second bias current value in a second time interval to refresh the one or more display elements with the second refresh rate.

16. A driving circuit comprising:

a first source operational amplifier (SOP), configured to drive a first display element of a display panel; and a second SOP, configured to drive a second display element of the display panel, wherein the first SOP is operated at a first bias current value in response to the first display element being refreshed with a first refresh rate and the second SOP is operated at a second bias current value different from the first bias current value in response to the second display element being refreshed with a second refresh rate different from the first refresh rate, and wherein the first refresh rate is greater than the second refresh rate, and the first bias current value is smaller than the second bias current value.

17. A source operational amplifier (SOP) for driving a plurality of display elements on a display panel, the SOP comprising:

a differential input pair for receiving an input signal of the SOP;

a current source pair for providing an operating current for the SOP; and a first bias control circuit, configured to supply a first bias current to one of the differential input pair and the current source pair;

wherein when a refresh rate of a display element among the plurality of display elements driven by the SOP changes, the first bias current generated by the first bias control circuit is adjusted accordingly, wherein the first bias current has a first value in response to the display element being refreshed with a first refresh rate, and the first bias current has a second value different from the first value in response to the display element being refreshed with a second refresh rate different from the first refresh rate, and wherein the first refresh rate is greater than the second refresh rate, and the first value is smaller than the second value.

18. The SOP of claim 17, further comprising:

a second bias control circuit, configured to supply a second bias current to another one of the differential input pair and the current source pair;

wherein when the refresh rate of the display element changes, the second bias current generated by the second bias control circuit is adjusted accordingly.

19. The SOP of claim 17, wherein the first bias control circuit is coupled to a bias voltage generator, to receive a bias voltage from the bias voltage generator, wherein the bias voltage is modified to adjust the first bias current.

20. The SOP of claim 17, wherein the plurality of display elements comprise a first display element and a second display element at different locations on the display panel, and the first bias current has a first value when the first display element is refreshed and has a second value when the second display element is refreshed;

wherein the first display element and the second display element are refreshed with different refresh rates.

21. The SOP of claim 17, wherein the first bias current has a first value in a first time interval in which the SOP refreshes one or more display elements among the plurality of display elements with a first refresh rate, and has a second value in a second time interval in which the SOP refreshes the one or more display elements with a second refresh rate different from the first refresh rate.

* * * * *